United States Patent [19]

le Clerc de Bussy

[11] 4,374,799

[45] Feb. 22, 1983

[54] METHOD FOR CASTING PARTS MADE OF FUSED CERAMIC MATERIAL

[76] Inventor: Jacques le Clerc de Bussy, Atelier de la Chaussee, Route de Gaillefontaine, 76390 Aumale, France

[21] Appl. No.: 160,281

[22] Filed: Jun. 17, 1980

[30] Foreign Application Priority Data

Jun. 18, 1979 [FR] France .............................. 79 15485

[51] Int. Cl.[3] .............................. C04B 35/60; B29C 5/02

[52] U.S. Cl. .............................. 264/332; 65/73; 65/227

[58] Field of Search .............................. 264/332, 85, 101; 65/73, 75, 229, 347; 164/63, 257, 258; 222/595; 265/227, 228, 230, 231, 249

[56] References Cited

U.S. PATENT DOCUMENTS

| | | | |
|---|---|---|---|
| 1,758,463 | 5/1930 | Petersson | 164/257 |
| 1,953,427 | 4/1934 | Moorshead | 65/347 |
| 2,379,401 | 6/1945 | Poulter | 164/63 |
| 2,544,598 | 3/1951 | Kauna | 164/257 |
| 2,828,516 | 4/1958 | Black et al. | 266/230 |
| 3,635,791 | 1/1972 | Bly et al. | 266/239 |
| 3,774,668 | 11/1973 | Heimgartner | 164/63 |
| 3,834,587 | 9/1974 | Bengt et al. | 222/595 |
| 3,862,656 | 1/1975 | Weiler et al. | 164/63 |
| 3,863,706 | 2/1975 | Chandler et al. | 164/63 |
| 3,867,132 | 2/1975 | Perry | 266/227 |
| 3,880,634 | 4/1975 | Deeg et al. | 65/73 |
| 4,210,441 | 7/1980 | Wuth et al. | 75/24 |

FOREIGN PATENT DOCUMENTS

| | | | |
|---|---|---|---|
| 44-39228 | 9/1969 | Japan | 169/63 |

*Primary Examiner*—Willard E. Hoag
*Attorney, Agent, or Firm*—Frost & Jacobs

[57] ABSTRACT

A method for casting parts of fused ceramic material, from a bath of oxides maintained in the liquid state in a furnace and permanently covered by a layer of powdery batch material are disclosed. The method comprises the following steps:

(a) connecting the mold internal cavity, through its lower part, to a downwardly directed feed duct,
(b) dipping the lower end of said duct in the liquid bath,
(c) establishing in the mold a vacuum causing the bath liquid to rise in the duct and in the mold,
(d) allowing the product to solidify in the duct;
(e) lifting the mold, together with the duct, and transporting the same apart from the furnace,
(f) allowing complete solidification of the product in the mold.

Preferably material is removed on a limited area of the bath surface by being swept away with a downwardly directed gas jet, for instance flowing through the feed duct is then lowered through this area free of powdery material into said liquid bath.

3 Claims, 2 Drawing Figures

METHOD FOR CASTING PARTS MADE OF FUSED CERAMIC MATERIAL

The present invention relates to a method for casting parts made of ceramic materials fused at high temperature.

The invention is particularly applicable to the production of parts from such ceramic materials which are liquid at a temperature over 1500° C., have either a limited range of plastic fusion or a clean fusion, and will crystallize during cooling. Examples of such ceramic materials are mullite consisting of about 70% by weight $Al_2O_3$ and 30% $SiO_2$, having a melting point around 1800°-1850° C., and some refractory materials containing $SiO_2$—$Al_2O_3$—$Z_2O_2$ as major components and having a melting point of about 1750° C.

These ceramic materials fused at high temperatures, mainly containing various oxides such as alumina, silica, magnesia, zirconia, etc. . . . are characterized by their remarkable compressive strength and/or abrasion resistance, as well as by their refractory properties.

However, to be economically feasible, the obtention on a commercial scale of products fused at temperatures over 2000° C. requires the use of furnaces of substantial volumetric capacity and, at present, fused ceramic materials are cast as large bodies, e.g. of $0.60 \times 1 \times 2$ meters, which are subsequently cut into parts of desired shape and size. These large blocks have the advantage of allowing a trouble free slow cooling which leads to suitable crystallization but, due precisely to the mechanical characteristics of the product, the subsequent cutting operation is time-consuming, laborious and expensive both in equipment and energy. Therefore, small-size parts made of ceramic material fused at high temperatures, and especially those of intricate form, are still of restricted used.

Of course, it might be contemplated to produce such parts by direct casting, but there occurs problems relating to the required mold material; due to the pouring temperatures and chemical nature of the materials to be cast, use must be made of a siliceous or similar sand agglomerated with binder that is non reducing or, in other words, non organic, for example sodium silicate, and the mold should be surrounded by thermally insulating material. The thus obtained molds are of low strength and will hardly withstand direct pouring, with mold filling from above. For the same reasons, conventional type bottom casting with a long liquid-feed runner will be troublesome, in particular due to the excessive cooling occurring in the runner.

A method was proposed, almost half a century ago (French Pat. No. 752.967), wherein the internal cavity of the mold is connected by its lower portion to a downwardly directed feed duct, the lower end of this duct is immerged in the liquid bath, then a vacuum is created in the mold for causing the bath liquid to rise in the duct and in the mold. The bath liquid will solidify in the mold cavity and, when the vacuum is related, the excess liquid will return to the bath. To avoid clogging of the feed duct, said duct is heated to the temperature of the fused material. This method solves some of the above problems, but the mold should then be held above the bath until solidification of the product to the required depth, this being hardly compatible with industrial rates.

Another reason for which this method was not brought into practice is that it makes no provision to remove the supernatent slag, slum and impurities which are almost unavoidable on a bath of liquefied ceramic material. Of course, no provision either is made to remove the layer of powdery oxides which cover the bath when such expedient is used to keep constant the quantity of material in the furnace, or merely to limit heat losses. Now, it is to be noted that this expedient is all the more advisable as the cost of energy increases.

Attempts were made in the past to solve this problem by conventional means, that is temporary cleaning with a rake. Another possible means is to blow compressed air with a slanted lance. Said attempts were ineffectual since: where a rake is used, if the latter is driven slowly, re-formation of the supernatent layer begins before the succion duct can be introduced and said duct might be broken by colliding with the rake, while if the rake is driven at a very high speed, bubbles might be created in the bath. With compressed air fed obliquely, the same difficulties might arise, viz either insufficient cleaning or bubble formation with, in both cases, production of defective parts.

For those reasons, casting of small parts made of ceramic material fused at high temperature is not in use at present.

The object of the present invention is to provide a method and a device allowing industrial production of parts made of ceramic materials fused at high temperature, said parts being of small size and possibly of intricate shape.

More precisely, the invention provides a method for casting parts of fused ceramic materials from a bath of oxides which is held in the liquid state in a furnace and is permanently covered with a layer of powdery batch material. Such furnaces are the sole furnaces used at present, since the layer of powdery batch material floating over the bath acts to limit energy losses. The furnace is normally of the so-called "self-lining" type, i.e. it has its walls and bottom, which are made of cooled metal, permanently separated from the liquid by an insulating, protecting layer of solidified ceramic material. Heating is usually effected by passing electric current through the bath, said current being fed by electrodes which may be immerged in the cental part of the furnace, said electrodes being made of heat-resisting metal inert with respect to the bath.

According to the method of the invention, the internal cavity of the mold is connected by its lower portion to a downwards directed, cooled feed duct, the powdery material is removed on a limited area of the bath surface by being swept away with a jet of gas directed from top to bottom, the feed duct is then lowered into this area free of powdery material and dipped into the liquid bath, then a vacuum is created in the mold to cause the bath liquid to rise in the duct and the mold.

Preferably, the jet gas is caused to pass through the feed duct by creating an overpressure in the mold during the operation stages preceding the application of vacuum.

Thus, the method affords a compromise between the advantages of direct casting, viz. a short rectilinear feed duct, and those of bottom casting, viz. calm feed of the liquid into the mold, without risk for the mold walls. The problem encountered to go through the powdery material covering the bath, with the risk of causing penetration unfused material in the mold, is solved by the compressed air overpressure.

The feed duct will clear its way through the powdery layer, which is restored all around it during molding, this minimizing heat losses.

The mold could be moved apart from the furnace only after solidification of the product in the mold but, with a view to limit the standstill time, it is preferable not to wait so long. In this case, measures should be taken to prevent the product from flowing down, with consequent emptying of the mold. This may be effected by means of a valve member arranged in the feed duct, or by maintaining the vacuum for a suitable time; however, the following procedure is preferable: at the end of the mold filling step, the product is allowed to solidify in the feed duct, then the mold, together with said duct, is raised off the furnace.

It is to be pointed out that the method permits to obtain, in extremely simple manner, hollow bodies with walls of constant or variable thickness; to this end, the vacuum in the mold is released before the liquid is solidified in the duct, so that the excess fluid will flow down into the bath. The product undergoes substantially instantaneous solidification adjacent to the mold wall down to a certain depth and only the central part, filled with liquid, becomes empty. There may thus be obtained parts in the shape of a tube, a crucible, etc.

By varying the thermal characteristics of the mold walls, it is possible to cause local variation of the wall thickness.

The device for implementing the method of the invention will now be described with reference by way of illustration only to one embodiment of the invention shown in the accompanying drawings, wherein.

Figure 1:
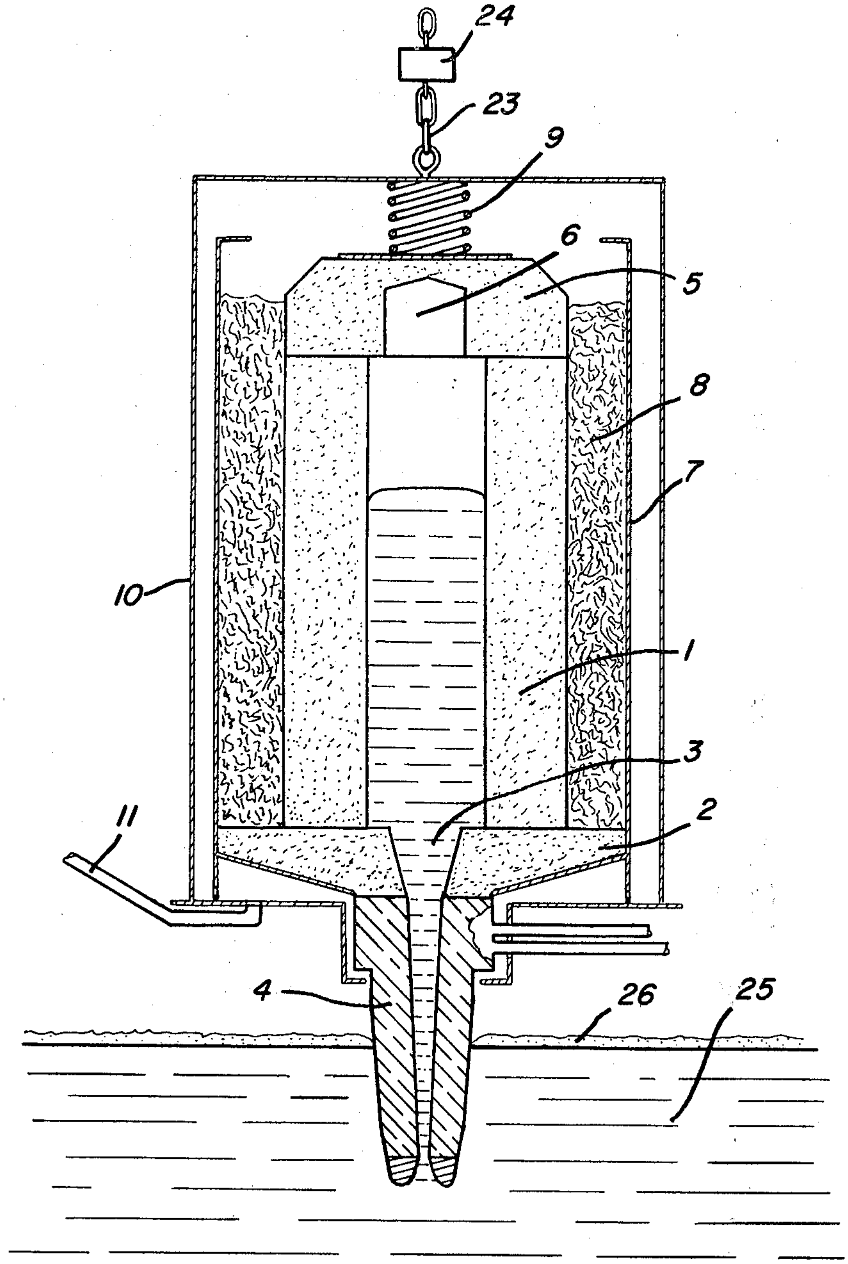
FIG. 1 is a general axial sectional view of the mold.

The mold 1 proper is made of silica sand bound with sodium silicate.

In the illustrated embodiment, use is made of a sand having a particle size of about 50–120 μm, bound with about 3% of sodium silicate, which is added before use with about 5–6% of a commercially available organic hardening agent. The molds obtained after baking at 400–500° C. have a pore volume of about 35–43%. Clearly, the particle size of the sand, the nature and amount of binder and the mold thickness are dependent on the refractory batch material used and on the material of the product to be obtained. In every case, it is usually preferable to provide the mold with an outer wire netting reinforcement allowing it to withstand the hydrastatic pressure. A base 2, made of the same material, includes a connecting portion 3 communicating the internal cavity of the mold 1 with the interior of the feed duct 4. A mold cover 5 has a recess 6, in communication with the internal cavity of the mold and intended to act as a riser. The assembly is supported by a metal thimble 7 through a thick interposed layer of kieselguhr 8, intended to afford thermal insulation and render the cooling as slow as desired.

A spring 9 maintains constant mutual bearing contact between cover 5, mold 1 proper and base 2.

Thimble 7 is arranged within a removable bell 10 forming a closed, sealed vessel which is connected through a line 11 to a vacuum and gas pressure source not shown. It was found that the mold has sufficient permeability for its internal pressure to follow accurately the pressure variations in bell 10.

Figure 2:
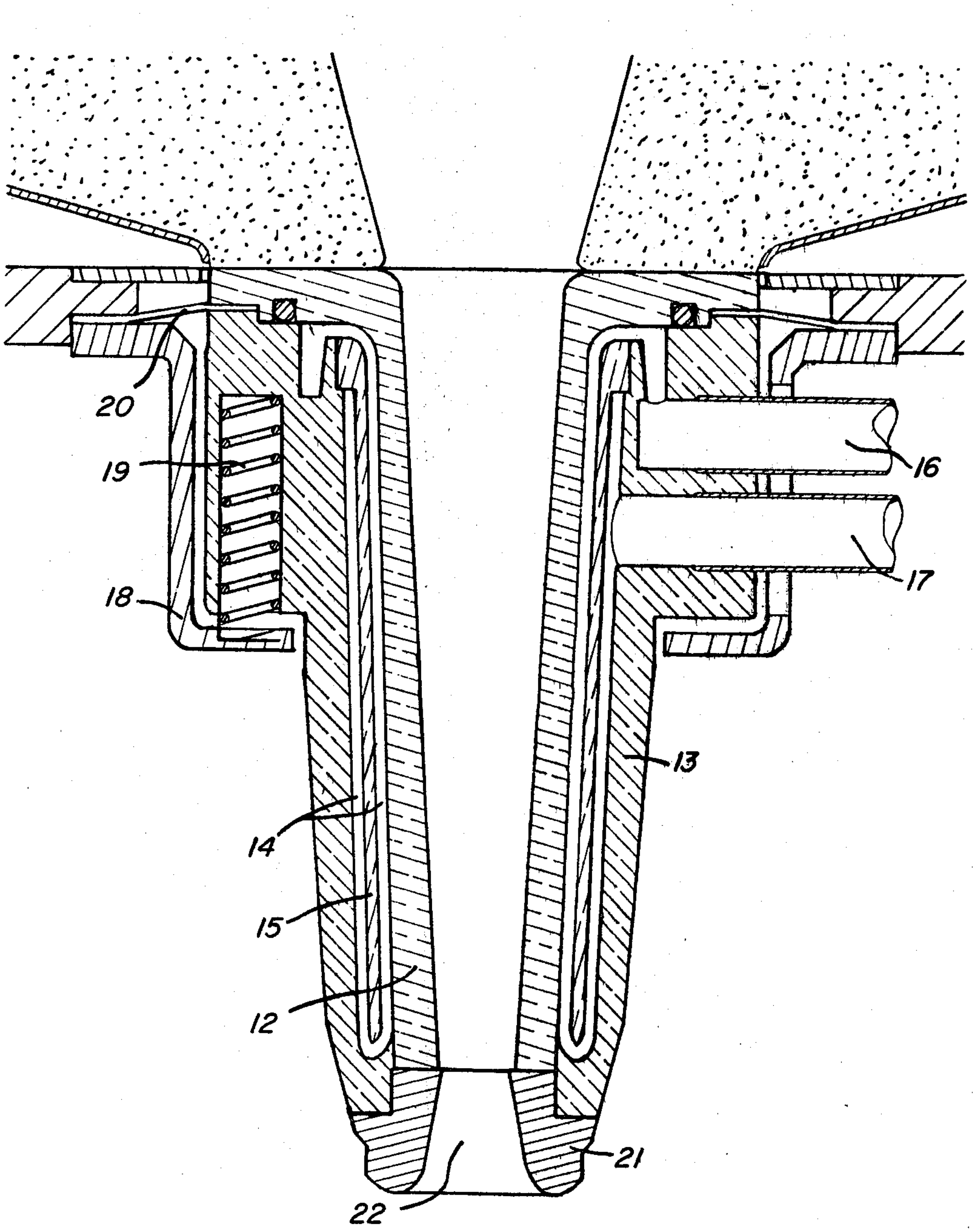
FIG. 2 is a fragmentary axial sectional view of the feed duct.

FIG. 2 shows in more details the feed duct or "sucker" 4.

Said duct has its major portion formed of a copper tube 12 provided with a frusto-conical bore flaring upwards. A second concentric tube 13 defines with tube 12 a water chamber 14 which is divided into two concentric portions by a cylindrical partition 15 terminating short of the chamber bottom. The two portions of the water chamber are respectively connected to a feed duct 16 and a discharge duct 17 for the cooling water. All of these parts are made of copper. The "sucker" is supported by a bracket 18, secured to the base of bell 10, through springs 19 urging it upwards against mold base 2, so as to prevent spilling of the liquid. A flexible seal 20 connects the bell base 2 with tube 12, so that the bell and tube form a gas-tight assembly having no opening other than tube 11 and the bore of the sucker tube 12.

The nose of the sucker is an annular part 21 made of molybdenum and threaded into tube 13 so as to bear against tube 12. Said part has an internal bore 22 of frusto-conical shape flaring downwards; said part 21 has its lowest diameter slightly smaller than that of tube 12 at the point of interengagement and presents at this location an acute edge. The reason for this arrangement is as follows: after removal of the sucker from the bath, a solidified mass is formed, comprising the material located in tube 12 and nose 21, as well as a certain amount of material collecting on the lower end of the nose. Removal of said solified mass from the sucker would raise problems, since said mass is fast with the cast part, on the one hand, and with the material collecting at the inlet of the nose, on the other hand. Said problems are avoided by the described arrangement since, due to its shape, part 21 will provide at the location of its junction with tube 12 a score in the thinnest portion of the solidified mass and the latter will rupture across said score when part 21 is unscrewed; the two resulting portions may then be readily separated from the sucker and its nose, due to the frusto-conical shape of those parts.

By way of example, use was made of suckers having a minimum diameter of 20 to 25 mm for mullite and of 17 mm for a refractory material consisting mainly of silica-alumina-zirconia.

It is clear the selection of a suitable shape for the sucker depends, among other factors, on the physical properties of the fused material, such as its viscosity.

The procedure is as follows: mold 1 is prepared with wire netting reinforcement, then put in place within thimble 7, together with its base 2 and cover 5. The thimble is then arranged in bell 10, having feed duct 4 already fit therein. The various mold parts and duct 4 are then urged together by springs 9 and 19. The bell is then suspended by a chain 23 carrying an interposed balance 24 and air is admitted at a low rate of flow, through line 11, into the bell. Said air flows through the mold and emerges through sucker 4. The assembly is then lowered towards the bath of fused material 25 which lies in an electric furnace of conventional type. The air flow acts to sweep away the powdery material 26 covering the bath, thus exposing the bath surface on a small area, then the nose enters the bath proper.

From this moment, the air flow ceases and this may be readily checked with a flow meter (not shown) arranged on line 11. Then the powdery material spreads to come into contact with the sucker, this limiting heat losses.

The sucker nose should be immerged to a sufficient depth to reach a zone where the bath is homogeneous and bubble-free, and to prevent any air from being sucked in during filling of the mold. However, too deep immersion of the sucker should be avoided to prevent excessive local cooling of the bath.

Thereafter, air pressure is released and line 11 is connected to the vacuum source, these steps occurring in very progressive manner. The final vacuum should be such as to raise the bath liquid at least up to the top of recess 6, to form the riser. A lower vacuum would result in uncomplete filling, while as higher vacuum, as well as a too abruptly established vacuum, might cause the liquid to lift the cover against the force of spring 9.

When the mold 1 is filled, it suffices to hold the assembly in place during a few instants, under vacuum, to cause solidification of the liquid in feed duct 4. In fact, it was found that said solidification does not occur as long as the liquid flows in said duct to fill the mold, but is effected at a high speed, which however varies according to the materials, as soon as flow is interrupted. Mold filling is sensitively ascertained by balance 24, which gives the aggregate weight of the bell, mold and material filling the same. It will be understood that control of the air flow through line 11 would be too inaccurate due to the gradual heating of the air present in the mold and kieselguhr pores.

Once the mold is filled and the liquid is solidified in the sucker, the bell is raised above the bath, then moved apart the furnace. During this period, it may be advantageous, in the case where explosive gaseous mixtures are liable to be formed in the bell (e.g. if the mold contains organic substances derived from the binder), to provide continuous scavenging of the bell. This may be effected by holding the vacuum until disassembly of the bell and by providing the bell wall one or more gauged air ports allowing air circulation with suitable flow rate and distribution. Said port may be provided to this end with a calibrated valve. Then, nose 21 is unscrewed and bell 10 is opened. Thimble 7 containing mold 1 is withdrawn upwardly from the bell mold 1 carrying a dependent frusto-conical stalk of material which was solidified in the tube bore. The mold is allowed to cool until complete solidification and return to a temperature permitting its disassembly and, meanwhile, the bell may be loaded with another thimble containing another mold for a subsequent casting operation.

If a hollow product is to be cast, the same equipment may be used; however, recess 6 in the cover, which is intended to form a riser, is no long required and cover 5 can, if desired, be suppressed to facilitate flowing down of the liquid. The procedure is the same as above; however, the vacuum is released after filling of the mold to the required level, but before solidification of the material in the sucker. The liquid then flows down into the bath, leaving a solidified layer of a thickness which may be precisely determined by previous tests made to ascertain the dwell-time for the liquid in the mold.

If the product tends to solidify rapidly in the sucker, this tendency may be counter-acted by alternate pressure and vacuum applications preventing stagnation of the liquid. This same technique can also be used in the case where solidification of the product is attended by pronounced shrinkage and where riser 6 does not suffice to refill the mold.

The liquid should not rise up to the cover, if the latter is retained, since this could cause formation on the inner surface of the cover of a layer poorly or not at all permeable, which would prevent vacuum release, and thus flowing down of the liquid.

According to another embodiment of the invention, hollow objects of small thickness are obtained by using a sucker which operates in the same way as a paint sprayer; said sucker has a lower diameter bore for the liquid and also, preferably, an air inlet, e.g. annularly disposed bores allowing controlled flow rate. The vacuum is produced in very abrupt manner and the liquid is then sprayed in the form of fine droplets which are deposited onto the mold wall where they solidify into a thin layer.

What we claim is:

1. A method for casting parts of fused ceramic material from a bath of oxides maintained in the liquid state in a furnace, said method comprising the steps of:

(a) providing a mold of refractory material which is permeable to gas and impermeable to the liquid ceramic material, said mold having a cavity with an orifice at its lower end, (b) connecting the lower end of the mold cavity to a downwardly directed feed duct having a small diameter port, (c) dipping the lower end of said duct in the liquid bath, (d) establishing a vacuum in the mold cavity by causing the gases in said cavity and said duct to pass through the said gas-permeable material of the mold, said vacuum causing the bath liquid to rise in the duct and in the mold cavity, said vacuum being applied to the mold in an abrupt manner so that the liquid is sprayed and propelled from said small diameter port against the mold walls, (e) allowing the bath liquid to solidify in the duct before the mold cavity is completely filled, (f) lifting the mold, together with the duct, away from the liquid bath and transporting the same away from the furnace, and (g) allowing complete solidification of the bath liquid in the mold, whereby to form a hollow casting in said mold cavity.

2. Method according to claim 1 wherein the vacuum in the mold is released after part of the bath liquid is solidified adjacent to the walls of the mold cavity but before the liquid is solidified in the duct.

3. Method according to claim 1, wherein the surface of the bath is covered by a powdery material, and wherein said powdery material is removed on a limited area of the bath surface by causing a downwardly directed gas jet to flow through the feed duct by creating an overpressure within the mold cavity prior to establishing a vacuum within the mold cavity, and the feed duct is thereafter lowered through the area of the bath surface from which the powdery material is removed.

* * * * *